United States Patent
Dazet et al.

(10) Patent No.: US 6,905,094 B2
(45) Date of Patent: Jun. 14, 2005

(54) AIRCRAFT WINDSHIELD ATTACHMENT DEVICE

(75) Inventors: Francis Dazet, Aucamville (FR); Pascal Chaumel, Plaisance du Touch (FR); Guy Cavailles, Leguevim (FR); Jean-Christian Beucher, Toulouse (FR)

(73) Assignee: Airbus France (FR)

( * ) Notice: Subject to any disclaimer, the term of this patent is extended or adjusted under 35 U.S.C. 154(b) by 0 days.

(21) Appl. No.: 10/263,494

(22) Filed: Oct. 2, 2002

(65) Prior Publication Data

US 2003/0062450 A1 Apr. 3, 2003

(30) Foreign Application Priority Data

Oct. 2, 2001 (FR) .............................. 01 12661

(51) Int. Cl.⁷ .............................................. B64C 1/142
(52) U.S. Cl. .............................. 244/129.3; 244/129.1; 52/400
(58) Field of Search ........................... 244/129.3, 129.1; 52/400

(56) References Cited

U.S. PATENT DOCUMENTS

| | | | |
|---|---|---|---|
| 2,482,770 A | | 9/1949 | Heineman ....................... 98/29 |
| 3,563,277 A | * | 2/1971 | Klipper ..................... 138/96 R |
| 3,953,630 A | * | 4/1976 | Roberts et al. ................ 428/38 |
| 4,699,335 A | * | 10/1987 | DeOms et al. ............ 244/129.3 |
| 5,027,567 A | * | 7/1991 | Roberts .......................... 52/57 |
| 5,277,384 A | | 1/1994 | Webb .......................... 244/129 |
| 5,845,872 A | * | 12/1998 | Pridham et al. ............. 244/1 A |
| 6,067,761 A | * | 5/2000 | Demeester ................... 52/208 |

FOREIGN PATENT DOCUMENTS

| | | | |
|---|---|---|---|
| DE | 4116397 | 11/1992 | |
| DE | 41 16 397 | 11/1992 | ............ B64C/1/14 |
| EP | 0 893 340 0 | 1/1999 | ............ B64C/1/14 |
| FR | 1 537 215 | 10/1968 | |

OTHER PUBLICATIONS

SP 19625 GP–*Jendi II Juillet* 2002—p. 1/2.
French Search Report 24 juin 2002—p. 1/2.

* cited by examiner

*Primary Examiner*—Michael J. Carone
*Assistant Examiner*—Rick Palabrica
(74) *Attorney, Agent, or Firm*—Thelen Reid & Priest, LLP

(57) ABSTRACT

Device for attachment of an aircraft windshield.

The device comprises a monoblock flange (14). The flange is fixed to the structure (12) of the aircraft by screws (16), so as to trap a peripheral edge of the windshield glass (10) between the flange and the structure. A dry monoblock seal (18) surrounds the peripheral edge of the windshield, such that the seal alone provides leak tightness between the inside and the outside of the aircraft. Preferably, the screws (16) are in contact with the flange (14) through plane surfaces perpendicular to the center lines of the screws. At least one second dry monoblock seal (20) may also be placed between the flange (14) and the structure (12).

13 Claims, 3 Drawing Sheets

AIRCRAFT WINDSHIELD ATTACHMENT DEVICE

TECHNICAL FIELD

The invention relates to a device to fix a windshield onto an aircraft structure.

The invention is applicable to all aircraft types and particularly to civil and military aircraft and to helicopters.

STATE OF THE ART

In a known manner, an aircraft windshield is usually fixed to the structure of this aircraft by several attachment flanges fixed to the said structure by countersunk head screws. More precisely, the outside edges of the windshield are clamped between the flanges and the structure of the aircraft. A sealing mastic such as polysulfide mastic (known in aeronautics under the term "PR") covers the different surfaces in contact and fills the interstices.

According to a first known attachment technique illustrated particularly by document U.S. Pat. No. 5,277,384, the countersunk head attachment screws pass through holes provided for them in the windshield close to the outside edges of the windshield.

This known technique has the disadvantage that the attachment screws apply mechanical constraints to the windshield which causes risks of breaking it. These constraints may in particular be due to deformations of the aircraft structure under extreme flight conditions, and to the difference in expansion between the windshield glass, the flanges, and the metal structure when the temperature changes while the aircraft is in the climb and descent phases.

According to another known attachment technique, the outside edges of the windshield are covered with a dry seal such as a silicone seal and the different flanges are fixed to the aircraft structure by countersunk head screws that do not pass through the windshield. The windshield is then clamped onto its peripheral seal between the different flanges and the aircraft structure.

Compared with the first known technique described above, this second known technique reduces risks of breaking the windshield. However, each of these two techniques have other disadvantages which will be described below.

The two techniques known at the present time for fixing aircraft windshields make use of countersunk head screws. These screws are chosen because their heads do not project outside the fuselage, which could degrade the aerodynamic performances of the aircraft. Thus, the head of each screw bears on a conical end of an attachment hole machined for this purpose in the corresponding attachment flange. Therefore, the effect of clamping each screw is to center the conical part of the hole on the center line of the screw.

However, since each flange is usually fixed on the aircraft structure using a large number of screws, each screw has the effect of centering the said flange on its own attachment hole during clamping. Therefore, it is a good idea if the different attachment holes made in the aircraft structure to hold the screws common to a particular flange should be perfectly aligned with the holes made in the said flange, so that the centering forces of the screws do not oppose each other.

This requires very high machining precision, resulting in a high manufacturing cost.

Furthermore, despite precautions taken while machining the holes, it is possible that at least one of the holes has a slight alignment defect.

Furthermore, depending on the placement conditions and particularly the temperatures of the different parts of the assembly, it is possible that there are different expansion movements between the flanges and the aircraft structure which can cause alignment problems for some holes. In this case, the screw head cannot fit correctly into the conical part of the flange provided to hold it. The effect of this is to leave an interstice between the screw and the conical end of the hole. This interstice enables moisture to enter between the screw and the flange, which could cause corrosion of the aircraft structure and/or seizure of the screw, making subsequent disassembly of the windshield difficult.

Furthermore, screws with heads that do not fit perfectly into the conical ends of holes form preferred points of impact for lightning strikes. If lightning strikes one of the screws, severe damage is often caused to the aircraft, such as damage to the structure or the flange.

Other disadvantages of known techniques for attachment of aircraft windshields relate to the difficulty in disassembling the windshield when it has to be replaced, which is usually necessary several times during the life of an aircraft.

A first disadvantage is due to the fact that PR mastic bonds very strongly onto the surfaces to which it is applied. Therefore disassembly of the different parts joined by this mastic is particularly difficult. The mastic must be cut with tools such as scrapers, which are inconvenient to use for personnel and there are disadvantages for the aircraft structural elements. Furthermore, the risk of degrading the quality of the work done is increased if inappropriate tools are used.

Another disadvantage that occurs during disassembly applies to removal of the screws. After several years of operation of an aircraft, it sometimes occurs that some screws show signs of a seizure phenomenon. This risk is increased for screws that fit into holes that are not aligned as described above. In this case, screws are even more difficult to remove if they are driven by a screwdriver, since with a screwdriver it is impossible to apply a torque as high as would be desirable to unscrew them. Furthermore, repeated sliding of the screwdriver on the screw head, which occurs frequently when there is a seizure phenomenon, frequently damages the screw head which makes unscrewing even more difficult. Furthermore, this sliding can cause the screwdriver to slip and possibly damage the flange or the structure of the aircraft.

There are also many different screwdriver profiles. Therefore personnel responsible for maintenance operations need to have a large number of tools available, and they have to choose the best tools for disassembly of the screw concerned. This choice of a screwdriver on the maintenance site can cause a loss of time and consequently an increase in the cost of replacing the windshield. Furthermore, considering the large number of tools usually available for maintenance personnel, it is not completely impossible that a mistake might be made in choosing the right screwdriver.

The above disadvantages are applicable to disassembly of a windshield and also increase the disassembly time. This is a nuisance for the airline company since the aircraft is then unavailable and therefore unproductive. The penalizing nature is even worse if the windshield must be replaced during an aircraft stopover since it causes a delay for the passengers or even a cancellation of the flight. If this delay is long, passengers then have to be provided with accommodation which can sometimes cause problems with space, particularly if there is a large number of transported passengers.

Other disadvantages of known techniques for attachment of aircraft windshields are related to the use of PR mastic to make them leak tight. After its application, this mastic requires several hours polymerization time before the aircraft can takeoff. This once again increases the time during which the aircraft is immobilized and the resulting disadvantages. Furthermore, it may be necessary to use a special type PR mastic, depending on the model of the aircraft and particularly if they are made by different manufacturers. This can sometimes cause procurement problems on maintenance sites.

PRESENTATION OF THE INVENTION

The purpose of the invention is precisely a device for the attachment of an aircraft windshield, the original design of which enables good leak tightness between the outside of the aircraft and the inside of the cockpit and good air tightness from the inside of the cockpit to the outside of the aircraft, when the pressure differential between the inside of the cockpit and the outside of the aircraft is positive and when it is negative, minimizing the degradation to aerodynamic performances of the aircraft without any of the disadvantages of attachment techniques according to prior art.

According to the invention, this result is obtained by means of a device for attachment of a windshield glass onto an aircraft structure, characterized in that it comprises a monoblock flange, screws with heads capable of fixing the flange onto said structure by trapping a peripheral edge of said windshield glass between them, and a first dry monoblock seal surrounding said peripheral edge, such that the seal alone provides leak tightness and air tightness between the inside and the outside of the aircraft, in which the screw heads are in contact with said flange through plane surfaces orthogonal to the center lines of said screws.

Use of a monoblock flange clamping the first dry seal around the peripheral edge of the windshield provides leak tightness between the inside and the outside of the aircraft without using polymerizable mastic such as PR mastic.

Thus, when putting the windshield into place, there is no need to apply mastic and then wait for several hours until it polymerizes, which significantly reduces the immobilization time of the aircraft. Furthermore, the lack of mastic simplifies disassembly of the windshield, which also reduces the time necessary for replacement of the windshield and therefore also reduces the immobilization time of the aircraft.

Advantageously, the device also comprises at least one second dry monoblock seal housed in a groove formed in a face of the flange facing the structure, such that the seal alone provides leak tightness between the flange and said structure. This second dry seal makes a leak tight joint between the flange and the aircraft structure without the use of mastic.

The second dry monoblock seal may generally be plane, so that each of the screws can pass through it.

Advantageously, the second dry seal, which is generally plane, then comprises annular swellings surrounding each screw so that it comes into contact with the screws.

Advantageously, the screw heads are housed in recesses formed in a face of the flange facing the outside of the aircraft, so that they do not project above said face.

According to a first embodiment, each of the holes is then closed by a cap piece that is flush with said face of the flange facing the outside of the aircraft. Advantageously, a small hole passes through each cap piece, to balance pressures between the recess into which the screw head fits and the outside of the aircraft. Preferably, each cap piece is fixed in the recess of the flange by nesting.

According to a second embodiment, the recesses are covered by at least one section that materializes at least part of said face of the flange.

Advantageously, the screw heads are covered by a substance such as grease or vaseline to limit penetration of moisture and therefore seizure of the screws.

Preferably, the first dry monoblock seal comprises striations on one face of this first seal facing the outside of the aircraft and in contact with said flange. These striations prevent moisture from penetrating into the thickness of the cockpit structure, which could cause corrosion of this structure.

A third dry annular seal may be placed between the flange and the structure around each of the screws.

At least one other dry monoblock seal may be installed on a peripheral edge of the flange, facing the outside of the windshield glass.

BRIEF DESCRIPTION OF THE DRAWINGS

We will now describe illustrative and non limitative examples of different preferred embodiments of the invention with reference to the attached drawings, in which.

DETAILED DESCRIPTION OF PREFERRED EMBODIMENTS OF THE INVENTION

Figure 1:
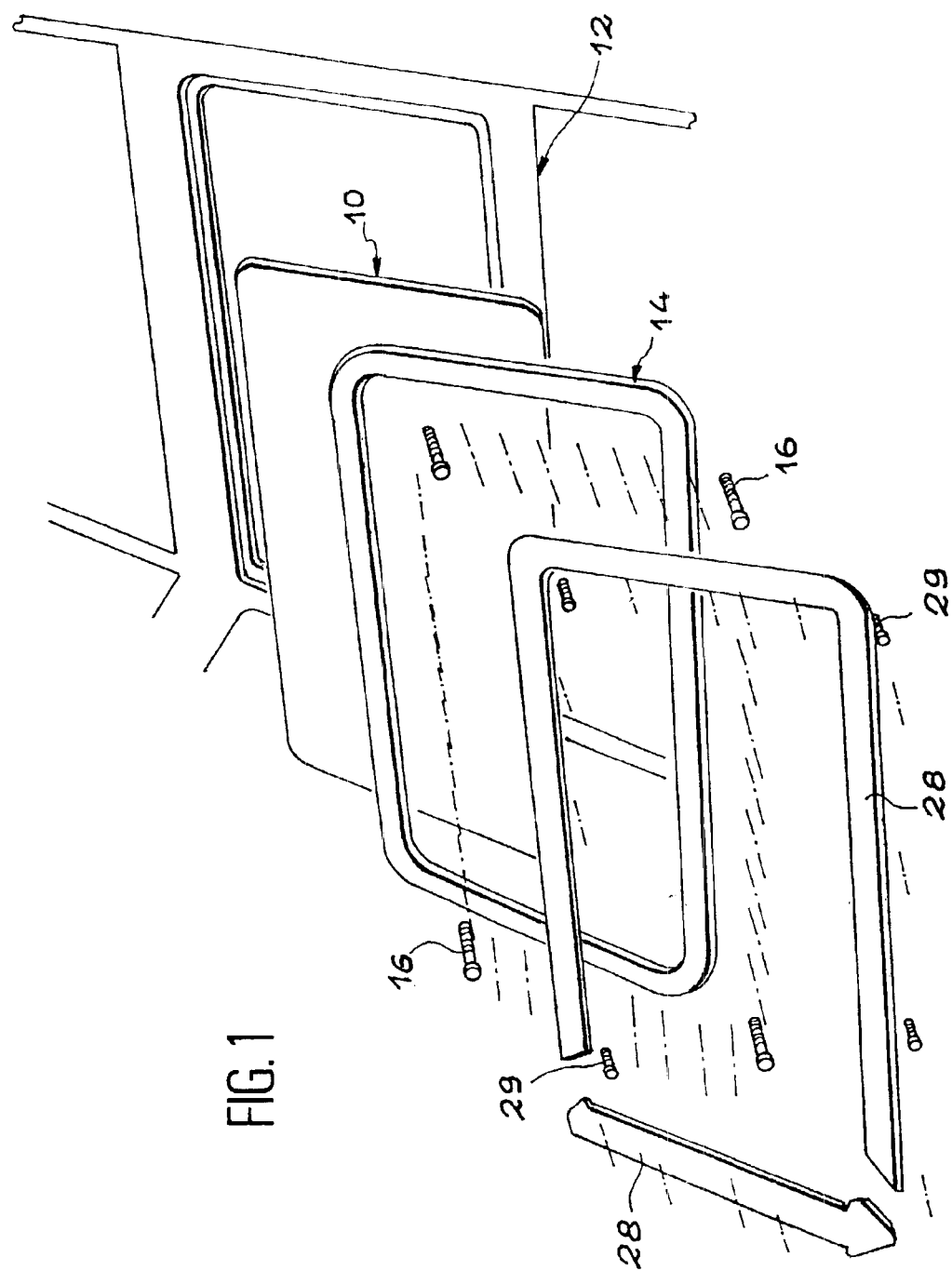
FIG. 1 is an exploded perspective view showing an aircraft windshield attachment device according to a first embodiment of the invention.
Figure 2:
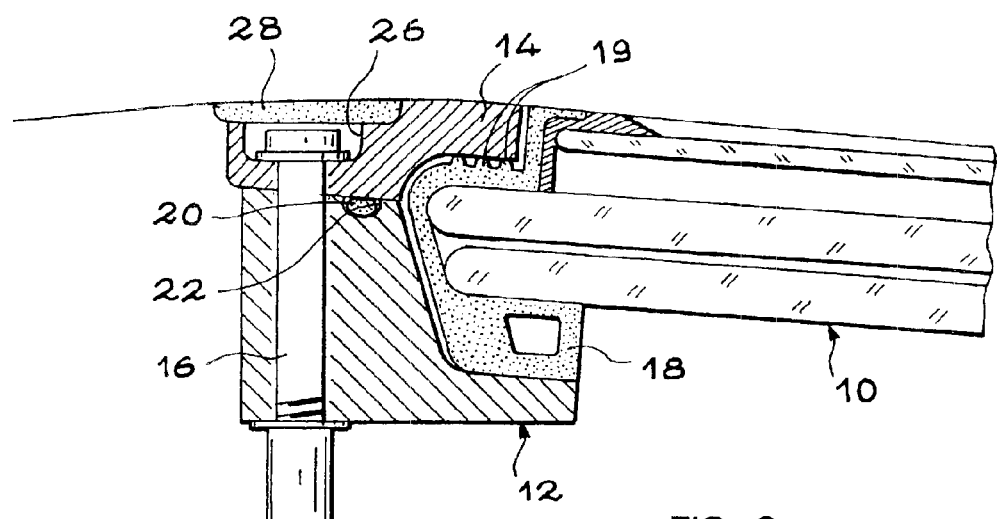
FIG. 2 is a sectional view of the windshield attachment device according to FIG. 1.
Figure 3:
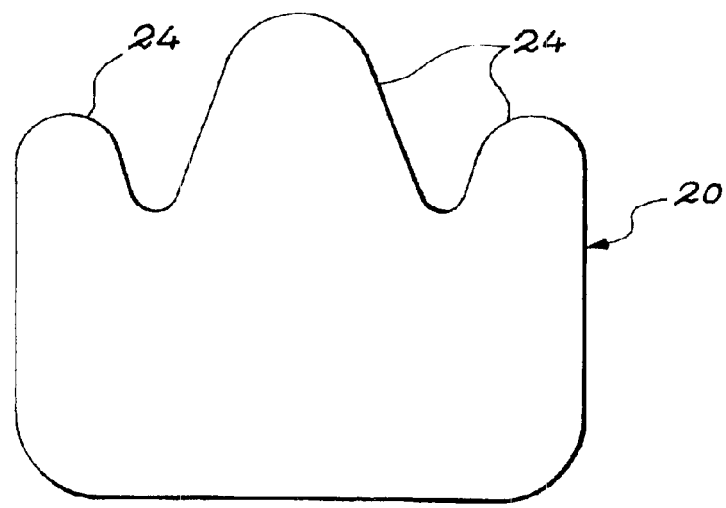
FIG. 3 is an enlarged section of a dry monoblock seal for the attachment device shown in FIGS. 1 and 2.

FIGS. 1 to 3 illustrate a first embodiment of the invention.

More precisely, these figures show a device according to the invention designed for the attachment of a glass 10 of an aircraft windshield on a structure 12 of said aircraft. To simplify the figure, only one of the glasses 10 is shown with its attachment device. In practice, the windshield comprises several glasses, each of which is installed on the aircraft structure using a special attachment device.

Each glass 10 in the windshield has one face facing towards the outside of the aircraft called the "outer face", and one face facing towards the inside of the cockpit called the "inner face". The part of the structure 12 on which each of the glasses of the windshield is fixed is materialized by a frame that surrounds the said glass 10.

As shown in particular in FIGS. 1 and 2, the attachment device according to the invention comprises a monoblock flange 14, with a shape comparable to the shape of the frame formed by the structure 12 around the glass 10. The shape of the monoblock flange 14 is also comparable to the shape of the peripheral edge around the glass 10.

The monoblock flange 14 is designed to be fixed on the frame formed by the structure 12 around the glass 10 using screws 16, for which the structure and the layout will be described later. More precisely, the monoblock flange 14 is installed on one face of said frame facing towards the outside of the aircraft, so as to trap the peripheral edge of the glass 10 between the flange and the structure of the aircraft when said flange is fixed on the aircraft structure.

The monoblock flange 14 is preferably made of metal, using modern machining means such as high speed machining on a numerical control machine. These machining means reduce deformations of the flange during machining. The monoblock flange may be considered as a narrow and easily deformable ribbon.

According to the invention, the attachment device also comprises a first dry monoblock seal 18 that entirely surrounds the peripheral edge of the glass 10. In particular, this first dry seal 18 may be made of silicone. The shape presented in section by the first dry seal 18 is such that it completely surrounds the edge of the glass, such that it is never in direct contact with the support 12 or the flange 14.

Thus, when the monoblock flange 14 is clamped on the support 12 by screws 16, the first dry seal 18 that surrounds the peripheral edge of the glass 10 is compressed such that said seal 18 alone provides leak tightness between the inside and the outside of the aircraft leak tight around the entire periphery of the glass 10.

As shown in FIG. 2, the first dry seal 18 preferably includes striations 19 on one face of said seal facing towards the outside of the aircraft and is designed to come into contact with the flange 14 when the flange is fixed on the support 12 by screws 16.

The striations 19 help to improve the leak tightness provided by the first dry seal 18. They reduce the possibilities of moisture entering the cockpit by forcing it to follow a labyrinth shaped path. Furthermore, since the striations 19 are located on the outside face of the windshield, moisture is prevented from penetrating into the thickness of the cockpit structure, which in some cases could cause corrosion of said structure.

According to the invention, the device for attachment of the glass 10 onto the support 12 also comprises at least one second dry monoblock seal 20, for example made of silicone. This second dry seal 20 is inserted between the flange 14 and the support 12. Its shape is such that it completely surrounds the glass 10, so that it defines a continuous closed sealing line around it. Thus, the second dry seal 20 alone provides leak tightness between the flange 14 and the structure 12 around the entire periphery of the glass 10.

The second dry seal 20 is housed in a groove 22 machined on the face of the structure 12 facing the flange, in other words towards the outside of the cockpit (FIG. 2) or in a groove machined on the face of the flange facing towards the structure 12, in other words towards the inside of the cockpit.

In the embodiment shown in FIG. 2, the second dry seal 20 shows a transverse section with the particular shape shown in FIG. 3. This shape is characterized by three faces orthogonal to each other (in section) designed to be housed in the groove 22 and through a face provided with three rounded lips 24, with unequal lengths, designed to come into leak tight contact with the device without a groove (flange 14 in FIG. 2) when the flange 14 is fixed on the structure 12.

Although only one second dry seal 20 is shown on the figures, the invention also covers the case in which two or more seals are inserted between the flange 14 and the structure 12. Each of the seals is then a monoblock seal and forms a closed continuous line, independently of the others.

Therefore according to the invention, the seal is made entirely using dry seals. This arrangement has several advantages. Firstly, when a windshield is installed, there is no need to apply a sealing mastic such as PR mastic and then wait for several hours until it polymerizes. This considerably reduces the immobilization time of the aircraft. Then, when the windshield is being disassembled, the lack of a sealing mastic eliminates the need to unstick this seal, which is a difficult operation as has already been mentioned. This also reduces the time necessary for replacement of the windshield and therefore also the aircraft immobilization time.

As shown in FIGS. 1 and 2, the screws 16 pass through holes facing each other machined in the monoblock flange 14 and in the structure 12. More precisely, the heads of the screws 16 are facing towards the outside of the aircraft and their shape is such that each of them is in contact with the flange 14 through a plane surface orthogonal to the center line of said screw. In particular, the screws 16 may have hexagonal heads to achieve this purpose.

This arrangement requires lower machining precision than screws with countersunk heads, which increases machining tolerances for the different parts and reduces the manufacturing cost. Furthermore, the diameter of the flange attachment holes can be slightly increased in order to give a slight clearance when putting into position on the aircraft structure. Furthermore, better clamping can be obtained which also increases the assembly quality.

It is also possible to clamp the screws using a torque wrench, so that a nominal tightening torque can be applied in accordance with recommendations defined by the aircraft manufacturer. The improved clamping thus limits infiltrations of moisture between the flange, the aircraft structure and the screws, and therefore reduces the risks of the screws becoming seized by corrosion, which facilitates their disassembly.

Disassembly of the screws is further facilitated because the shape of their heads, for example hexagonal, enables a better grip using an appropriate spanner, and consequently enables a higher unclamping torque to be applied than is possible for screws with countersunk heads. Furthermore, for screws with countersunk heads, disassembly is frequently done using a screwdriver, which causes a risk of slipping that can cause damage to the flange or the aircraft structure. This risk is considerably reduced when screws with hexagonal heads are used, which can be unclamped using an appropriate spanner.

In the preferred embodiments of the invention, screw heads 16 are housed in recesses 26 with appropriate dimensions machined in the face of the flange 14 facing towards the outside of the aircraft. The dimensions of the recesses 26 are such that the heads of the screws 16 are completely retracted within the thickness of the flange 14 and do not project about its external surface.

In the embodiment illustrated in FIG. 2, the recesses 26 thus formed in the flange 14 are covered by at least one section or joint cover 28 which materializes at least part of the outside surface of the flange 14. This section 28 is composed of a plate, for example a metal plate that is fixed into an indent machined on the outside surface of the flange 14. The thickness of this indent is equal to the thickness of said plate. The recesses 26 are then machined within the bottom of the indent. The section 28 is fixed on the flange 14 by any appropriate means such as screws with countersunk heads 29 (FIG. 1).

The section 28 that covers all or some of the recesses 26 in which the flange 14 attachment screws 16 are housed, limits the disturbances of the aerodynamics of the aircraft caused by attachment of the flange 14.

Figure 4:
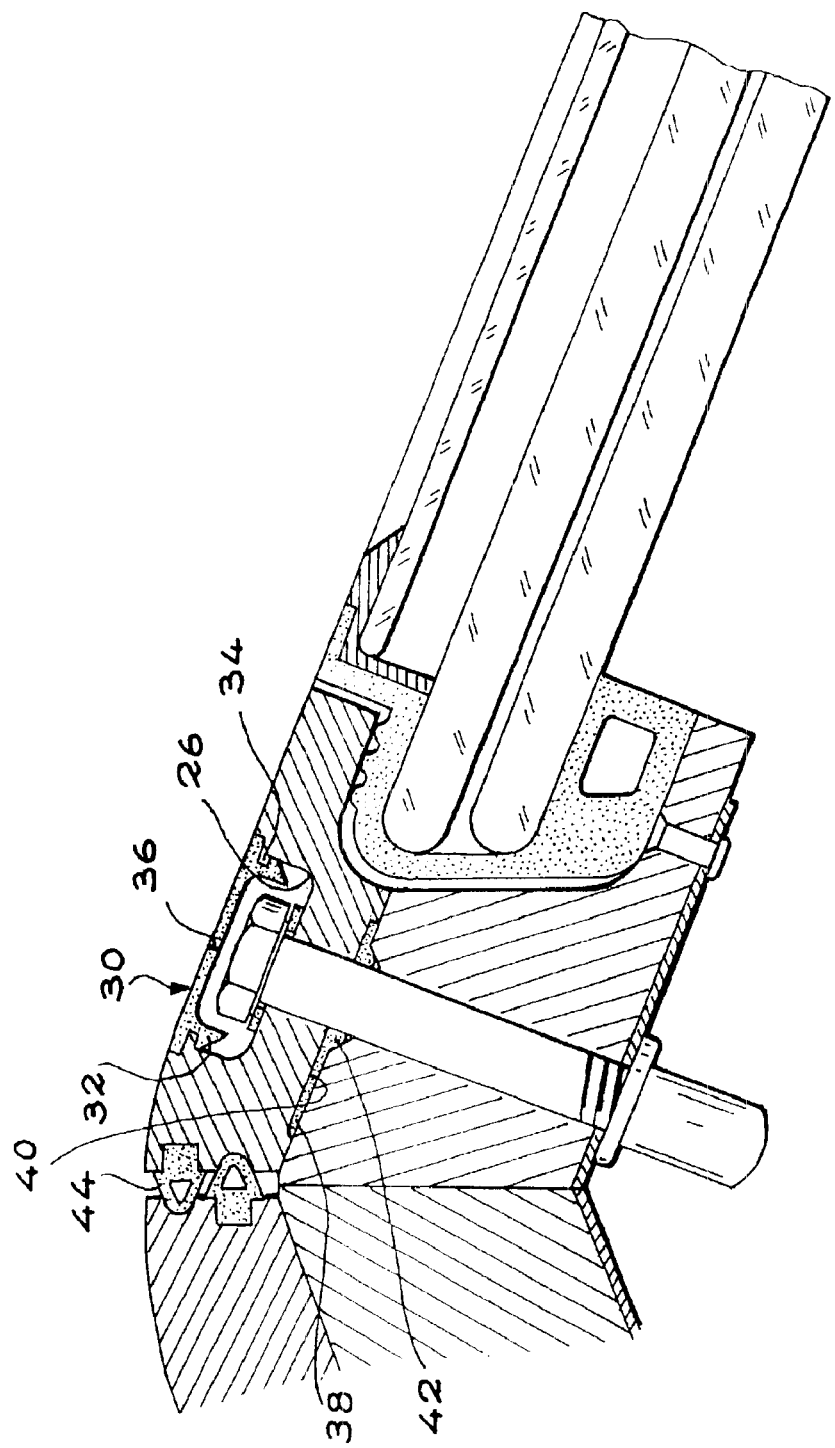
FIG. 4 is a sectional view comparable to FIG. 2, illustrating a second embodiment of the invention.

We will now describe a second preferred embodiment of the invention with reference to FIG. 4.

The main difference between this embodiment and the first embodiment described above with reference to FIGS. 1 to 3 is due to the fact that the section 28 is replaced by cap pieces 30.

More precisely, each recess 26 into which the screws 16 fit is closed by one of the cap pieces 30. Each cap piece 30 is flush with the face of the flange 14 facing towards the outside of the aircraft. If a section is used to close the recesses 26, the disturbances of the aircraft aerodynamics due to attachments of the flange are limited.

In particular, the cap pieces 30 may be fixed in the recesses 26 by insertion. This is why each cap piece 30 may be provided with deformable hooks 32, that fit elastically behind a projecting edge 34 machined on the outside end of the recess 26, for example by high speed machining.

This layout has the advantage that it enables simple and fast placement. To facilitate this placement, the cap pieces may be put into position on a support, for example made of paper or cardboard. When the support is applied to a windshield, all cap pieces can then be positioned on the different recesses in a single operation. The support is removed when the cap pieces have been inserted in the different recesses.

The cap pieces 30 are made from a material with appropriate properties, and particularly good resistance to abrasion. For example, this material may be a polyurethane plastic material.

A small hole 36 passes through each cap piece 30, for example with a diameter equal to approximately 0.5 mm. This hole 36 balances the pressure between the outside of the aircraft and the cavity formed in each of the recesses 26, underneath cap piece 30. If this hole 36 is not present, the cap pieces 30 may be forced out at high altitude or deformed inwards on the ground. The holes 36 also have the advantage that extraction of cap pieces 30 by an appropriate tool is facilitated when the windshield is replaced. In particular, this tool may be designed to destroy old cap pieces so that they can be taken out of the corresponding recesses without damaging the recesses.

In the various embodiments of the invention, the heads of screws 16 are advantageously covered after they have been tightened and before the section 28 or the cap pieces 30 are put into place, by a substance that limits penetration of moisture and therefore seizure of the screws. In particular, this substance may be grease or vaseline.

The embodiment illustrated in FIG. 4 is also distinguished from the embodiment in FIGS. 1 to 3 by the fact that the second dry monoblock seal inserted between the flange 26 and the structure 12 of the aircraft is a generally plane shaped seal 38. More precisely, the seal 38 is arranged such that each of the screws 16 pass through it. As described above, the dry seal 38 is housed in a groove 40 machined in the flange 14 (FIG. 4) or in the aircraft structure 12.

Advantageously, and as shown in FIG. 4, the second dry seal 38 is provided with an annular swelling 42 around each screw 16 that passes through it. The swellings 42 have the advantage that they improve contact between the seal 38 and the screws, in order to minimize moisture ingress from outside the aircraft, into screw holes formed in the aircraft structure 12.

As was also shown in FIG. 4, at least one other dry monoblock seal 44 may be installed on a peripheral edge of the flange 14, facing outwards from the glass 10 which is fixed by this flange. This seal 44 limits penetration of moisture from outside the aircraft towards the part of the structure 12 on which said flange 14 is fixed. Consequently, the seal 44 is in leak tight contact with the attachment flange of an adjacent glass 10.

According to a variant of the first embodiment, not shown on the figures, third dry annular seals are also placed between the flange 14 and the aircraft structure 12, around each screw 16. The function performed by these seals is similar to the function of the swellings 42 formed on the seal 38 in the embodiment illustrated in FIG. 4. In other words, they improve the seal in the assembly of the flange 14 on the aircraft structure 12, to prevent moisture from penetrating through the holes through which the screws 16 pass.

Obviously, the invention is not restricted to the embodiments that have just been described as examples. Thus, even if one or several seals such as seals 20 and 38 are desirable, the invention also covers the case in which the attachment device only comprises the first seal 18. Similarly, although the use of screws 16 with a plane contact surface is recommended, the use of screws with different shapes such as countersunk head screws is also covered by the scope of the invention.

What is claimed is:

1. Device for attachment of a windshield glass having a peripheral edge, an inner face and an outer face, onto an aircraft structure forming a frame having an outwardly facing face, said device comprising:
   a monoblock flange adapted to be fixed on said outwardly facing face of said frame, said monoblock flange having an outwardly facing surface;
   a plurality of screws capable of fixing the monoblock flange onto said frame, each said screw having an axis and a head facing outwardly and provided with an inwardly facing plane surface adapted to be in tightening contact with said outwardly facing surface of the monoblock flange, said inwardly facing plane surface being orthogonal to the axis of said screws;
   a first dry monoblock seal adapted to be mounted on said peripheral edge of the windshield glass, such that the first dry monoblock seal entirely surrounds said peripheral edge, whereby when the monoblock flange is fixed on the frame by said screws, the first dry monoblock seal is compressed both between the inner face of the windshield glass and the frame and between the outer face of the windshield glass and the monoblock flange around the entire periphery of the windshield glass, such that said first dry monoblock seal alone provides a leak tightness between the inside and the outside of the aircraft.

2. Device according to claim 1, in which at least one second dry monoblock seal is housed in a groove formed in a face of the monoblock flange facing the structure or conversely such that the second monoblock seal alone provides leak tightness between the monoblock flange and said structure.

3. Device according to claim 2, in which the second dry monoblock seal is generally plane, so that each of the screws passes through it.

4. Device according to claim 3, in which the second dry monoblock seal, which is generally plane, comprises annular swellings that surround each screw, to be in contact with the screws.

5. Device according to claim 1, in which the heads of the screws are housed in recesses formed in the outwardly facing surface of the monoblock flange, so that they do not project on said outwardly facing surface.

6. Device according to claim 5, in which each of the recesses is closed by a cap piece that is flush with said outwardly facing surface the monoblock flange.

7. Device according to claim 6, in which a hole passed through each of the cap pieces.

8. Device according to claim 6, in which each of the cap pieces is fixed in the recess of the monoblock flange in a tight fit.

9. Device according to claim 5, in which the recesses are covered by respective sections which form at least part of said outwardly facing surface of the monoblock flange.

10. Device according to claim 5, in which the heads of the screws are covered by a substance that limits penetration of moisture.

11. Device according to claim 2, in which the first dry monoblock seal comprises striations on a face of this first dry monoblock seal facing towards the outside of the aircraft and in contact with the said monoblock flange.

12. Device according to claim 2, in which a third annular shaped dry seal is placed between the monoblock flange and the structure around each of the screws.

13. Device according to claim 1, in which at least one other dry monoblock seal is installed on a peripheral edge of the monoblock flange facing towards the outside of the windshield glass.

* * * * *